US005652794A

United States Patent [19]
Lepetit et al.

[11] Patent Number: 5,652,794
[45] Date of Patent: Jul. 29, 1997

[54] DEVICE AND PROCESS FOR SECURIZING A DOCUMENT AND GRAPHIC AUTHENTIFICATION CODE

[75] Inventors: Olivier Lepetit, Sur Mer; Marie-Josèphe Revillet, Verson, both of France

[73] Assignees: France Telecom, Paris; La Poste, Boulogne Billiancourt Cedex, both of France

[21] Appl. No.: 514,405

[22] Filed: Aug. 11, 1995

[30] Foreign Application Priority Data

Aug. 16, 1994 [FR] France .................................. 94 10043

[51] Int. Cl.⁶ ........................................................ H04N 1/44
[52] U.S. Cl. .............................. 380/18; 380/51; 380/23; 380/30
[58] Field of Search ........................... 380/18, 23, 25, 380/30, 51

[56] References Cited

U.S. PATENT DOCUMENTS

| | | |
|---|---|---|
| 5,157,726 | 10/1992 | Merkle et al. . |
| 5,159,630 | 10/1992 | Tsent et al. .................... 380/18 |
| 5,208,858 | 5/1993 | Vollert et al. . |
| 5,245,655 | 9/1993 | Buhn et al. ..................... 380/18 |
| 5,337,361 | 8/1994 | Wang et al. ..................... 380/51 |
| 5,388,158 | 2/1995 | Berson ............................ 380/23 |
| 5,422,954 | 6/1995 | Berson ............................ 380/51 |
| 5,530,755 | 6/1996 | Pailles et al. ................... 380/18 |

FOREIGN PATENT DOCUMENTS

| | | |
|---|---|---|
| 0161181 | 11/1985 | European Pat. Off. . |
| 0600646 | 6/1994 | European Pat. Off. . |
| 0609142 | 8/1994 | European Pat. Off. . |
| 4003386 | 5/1991 | Germany . |
| 2244625 | 12/1991 | United Kingdom . |
| 9407326 | 3/1994 | WIPO . |

*Primary Examiner*—David C. Cain
*Attorney, Agent, or Firm*—Pearne, Gordon, McCoy & Granger LLP

[57] ABSTRACT

The invention relates to a device for securizing a document incorporating a processing module, which calculates and associates with each document page (10), comprising a zone (11) containing the text of the information to be certified, a graphic seal (12) representing it in the form of interlaced bar codes.

The invention also relates to a process for securizing a document and a graphic authentification code.

Particular application to the securized storage of documents and to securizing transmissions by fax.

25 Claims, 3 Drawing Sheets

DEVICE AND PROCESS FOR SECURIZING A DOCUMENT AND GRAPHIC AUTHENTIFICATION CODE

TECHNICAL FIELD

The present invention relates to a device and a process for securizing a document and to a graphic authentification code.

It more particularly applies to the securized storage of documents and to securizing transmissions by fax.

PRIOR ART

In the fax transmission field, the major advantages are the ease of use, the use of the public telephone network and direct transmission. However, it has a vital disadvantage, namely security. Therefore a document which has been faxed lacks any legal status.

Most fax machines are of group 3 and do not function in the error correction mode. These fax machines offer no integrity level. Deteriorations can be due to transmission, scanning and printing noise, or to deliberate acts of falsification. However, for a fax transmission, it is not possible to envisage the use of a signature of the exclusively electronic type on the bit map file (scanned image) for controlling the integrity. Thus, any transmission error modifies the signature. Moreover, the a posteriori non-repudiation of the document can only take place if the binary files of the faxes received are retained.

If two fax machines are used operating in the character mode, the use of an electronic signature is possible, because then transmission takes place in the error correction mode. However, the verification of the signature must take place manually with an adequate terminal, which is a long and fastidious operation.

The invention more generally aims at ensuring the integrity of a document and giving the origin thereof. It also serves to make the faxing of documents as reliable as possible in order in particular to avoid any a posteriori repudiation of a faxed document.

DESCRIPTION OF THE INVENTION

For this purpose the invention proposes a device for securizing a document, which incorporates a processing module, which calculates and associates with each page of said document a graphic seal representing it in the form of interlaced bar codes. It has spaces and bars, which respectively form the narrow or wide elements representing an information.

Advantageously, the graphic seal is organized sequentially in blocks of n bits and segments of bar code lines. In an embodiment, the document is a fax document, a securizing module placing a graphic coding corresponding to the seal in the transmitted binary file representing a page of said document.

In this embodiment, the device can incorporate a microcomputer, which calculates and inserts the graphic seal at the time of composing the message. It can also incorporate a securized fax machine with an integrated securizing module, or a fax machine with a securizing box or case in series on the transmission line.

Advantageously, a security module is integrated into the securizing module in order to obtain an electronic signature of the message, which is integrated with the graphic coding corresponding to the seal.

The security module comprises a smart card reader able to read a smart card individual to each user, who has a confidential code enabling him to authenticate it.

On the receiver side, the device according to the invention then incorporates a module for decoding and verifying the graphic seal.

The invention also proposes a process for securizing a document, characterized in that with each page of said document is associated a graphic seal representing it, formed from interlaced bar codes. It has spaces and bars respectively forming narrow or wide elements representing an information.

Advantageously, the graphic seal is sequentially organized in blocks of n bits and in bar code line segments.

The bit map file of the document is obtained directly or from the page rescanned during decoding. An "anti-noise" morphological filtering makes it possible to eliminate on that part of the bit map file corresponding to the graphic seal, the image defects which have occurred during transmission and/or printing and/or storage, whose size is strictly below the size of the narrow elements of the bar codes.

This is followed by a sequential reading of the seal line by line, segment by segment and from left to right, marks added during the formation of the seal permitting the guidance of its reading.

The seal is decoded in two stages, namely a graphic reading of each elementary bar code, followed by the association, by means of the truth table of the code, of the corresponding bits with the elementary code read.

In the case of erroneous reading for the elementary bar codes reached, the intrinsic redundancy of the code makes it possible to remove any ambiguity and correctly decode the erroneous code.

In the case of failure, an image processing procedure will determine the theoretical lengths of the bars or spaces as a function of deformations of the narrow and wide elements.

If the information on the narrow and wide elements is not sufficient, if the determined code is impossible, or if there is a disappearance of one or more spaces or bars, the seal graphic reading procedure leaves the elementary bar code indeterminate, the block of n bits linked with said bar code being able to assume all values $C_i$ from 0 to $2^{n-1}$, said indetermination being removed by means of the check code placed at the end of each bar code line segment.

In an embodiment, the document is a faxed document. With the transmission of each document page is then associated a graphic seal representing it.

The signature is located in the bottom of the transmitted page, or on a supplementary page gathering together the graphic signatures of all the pages of the same document.

On reception, a check is made of the consistency between the bits of the message and the bits of an electronic signature. This is followed by the verification of the consistency between the decoded graphic seal and the image received in uncoded form.

On reception, in the case of a posteriori verification, an "elastic" difference is made between the image from the graphic seal and the image received in uncoded form.

By associating a graphic signature with each faxed document page, the invention makes it possible to securize this transmission.

Advantageously, the invention also makes it possible to ensure the integrity of a document with respect to a third party or a "non-securized" addressee. It also permits the non-repudiation in transmission. Thus, if the addressee stores on paper the document received, the graphic seal provides proof of the origin of the fax. In the same way, any fraudulent action of the recipient on the received document can be detected through the lack of consistency between the message and the seal (non-repudiation on reception).

The interest of the invention is to permit a paper storage of documents in securized manner. It is more particularly suitable for the exchange of documents by fax. The use of image processing procedures makes it possible to associate a graphic seal with any faxed page. This seal guarantees the integrity of the document during its transmission or its storage on paper and gives the origin thereof.

According to the invention, the authentification graphic seal or code is formed from interlaced bar codes in which the spaces like the bars represent an information. The bars or spaces always have two widths, namely wide and narrow. For each coded symbol the number of wide bars or spaces is constant.

Advantageously the graphic seal is sequentially organized in blocks of n bits and segments of bar code lines. Left and right marks are placed at the start and finish of the code lines. Intermediate marks are placed between each segment. A check code is placed at the end of each bar code line segment. This code is used in a graphic seal placed at a given location of the image. Thus, it can be placed at the bottom of a document page.

Advantageously, the graphic seal according to the invention makes it possible to store the informations using a monodimensional bar code stack.

DETAILED DESCRIPTION OF EMBODIMENTS

The main object of the invention is to ensure the integrity of a document a give the origin thereof by means of the addition of a graphic seal representing it. The graphic seal is obtained by image processing.

This image authentification graphic coding is e.g. applicable to the securized paper storage of a document. Another application is the securized exchange by fax of documents. A description will now be given in exemplified manner of the graphic coding process in the case of a faxed document.

Figure 1:
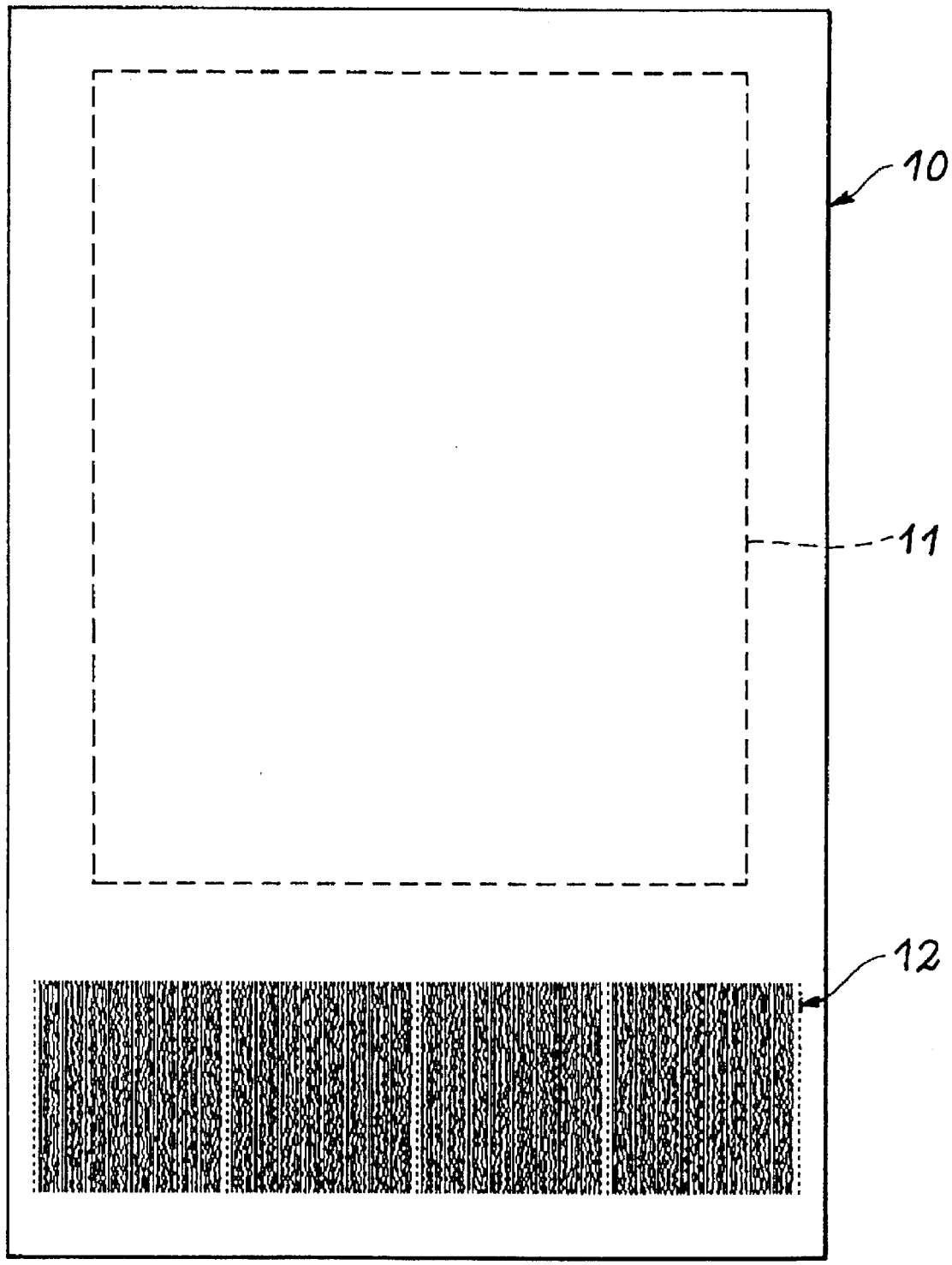
FIG. 1 illustrates a document page having a graphic seal according to the invention.

The invention then relates to the securizing of the faxed documents, by associating with each transmitted page a graphic seal representing it. This graphic seal has a good immunity from all noises occurring in the case of a fax exchange. It can be placed at a given point of the page in question, e.g. at the bottom thereof if the space is free, or on a supplementary page (called the security page), which gathers together the graphic seals of all the pages of a single document. FIG. 1 shows page 10 of a document having a zone 11 containing the text of the information to be certified and the graphic seal 12.

The information contained in the faxed page is summarized in a binary file obtainable in two ways:

in the case of a composition on a microcomputer, the ASCII codes of characters typed on the computer keyboard are collected and the codes are then converted into bits;

in the case of an already formed paper fax, the bit map file of the zone to be certified (message M) resulting from the scanning is compressed according to standard fax codes, thus supplying a usable binary file.

Figure 2:
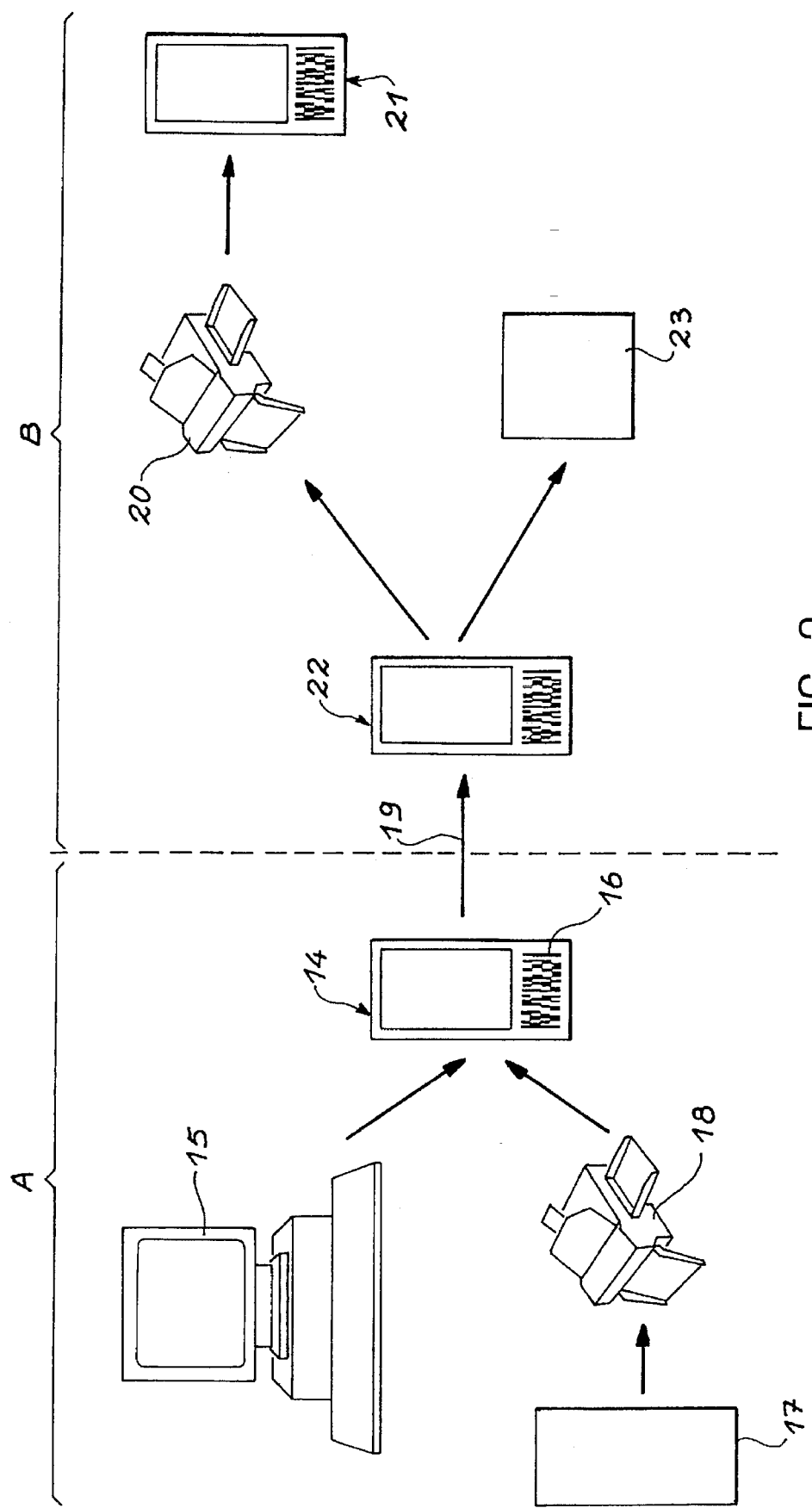
FIG. 2 illustrates the device according to the invention.

Thus, in the process of the invention and as shown in FIG. 2 on the side of the issuer A:

either the fax 14 is composed from a microcomputer 15, which calculates and positions the graphic seal 16 at the time of composing the message. The fax is then sent directly if the issuer has a fax transmission card or a fax add-on card for a microcomputer. If not it is printed and a conventional, non-securized fax machine can be used for transmission. The fax only contains the typed text, the logos and/or integrated figures not then being able to form part of the zone which is certified and for this purpose direct use is made of the bits of the typed ASCII codes;

or the fax 17 already exists on paper and it is then necessary to use a new generation fax machine 18 with an integrated securizing module, or use a securization box in series on the telephone line. The integrated or non-integrated securizing module determines and places in the bit map file of the document (file resulting from the scanning process) the page graphic seal. This configuration makes it possible to send any random type of message (typed text/manuscript, photograph, plan, etc.).

The securizing module is included either in the fax machine, or in a separate box or case, or in the microcomputer. A security module integrated into the securizing system makes it possible to obtain an electronic signature of the message, which is incorporated into the graphic coding.

This security module has a smart card reader able to read a smart card individual to each user. The user wishing to transmit a securized fax must insert his smart card containing his keys or codes in order that it can calculate the signature.

On the recipient B side, any fax machine 20 can be used for obtaining a document 21 corresponding to the document 22 received from the transmission line 19. However, if the recipient B wishes to himself verify the integrity of the document and its origin, he must have a machine containing a securizing module. This verification can take place at the time of reception, but also subsequently. It will then be necessary for the recipient to rescan the paper document retained by him. If the recipient B has no securized fax machine, he can ask a server 23 to check the integrity of the document and prove its origin. The recipient then scans the paper page received and transmits the bit map file by fax to the server. The server has a graphic seal decoding and verification module. Another solution for B is to use another securized fax machine.

Figure 3:
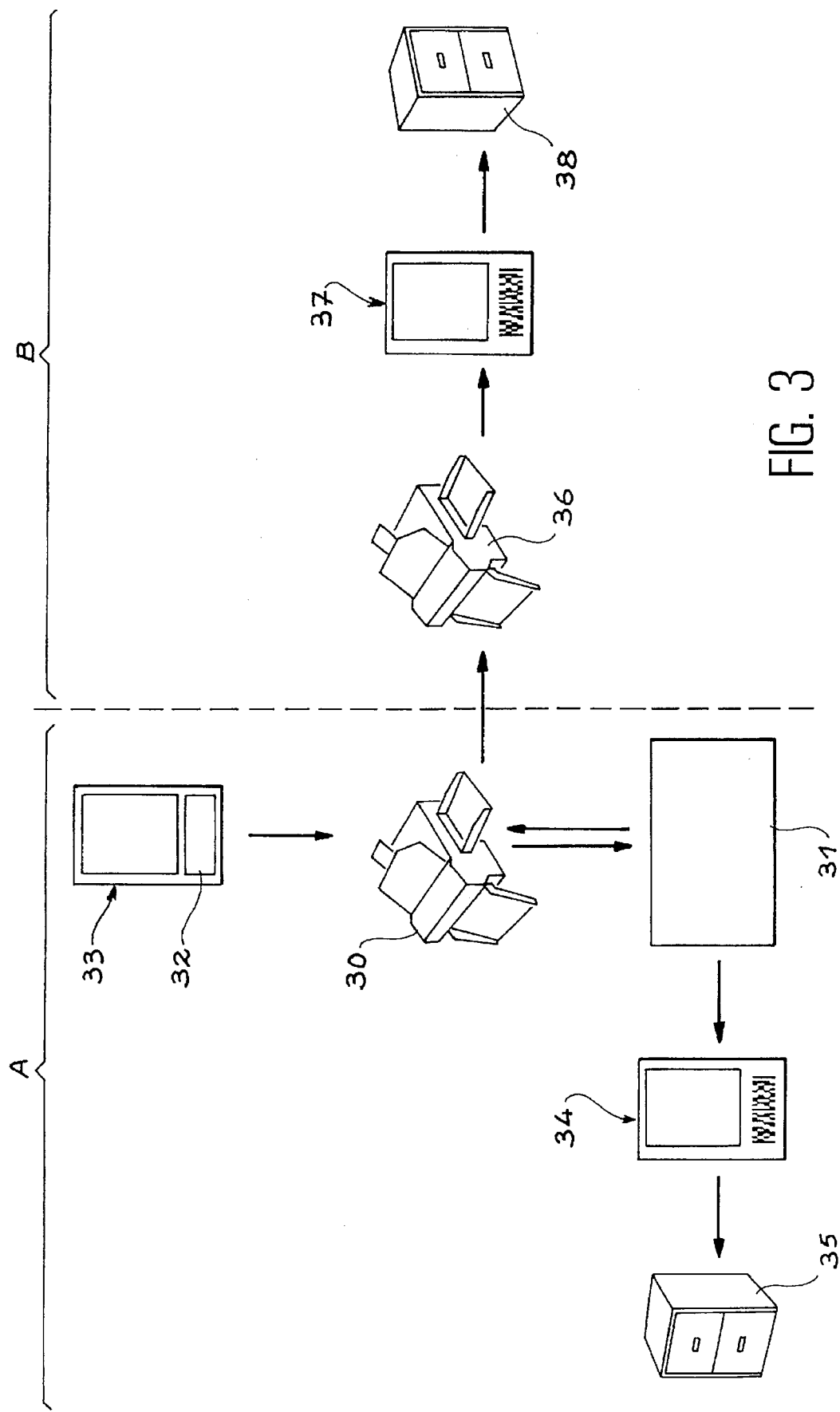
FIG. 3 illustrates a variant of the device according to the invention.

As shown in FIG. 3, if the issuer only has a standard fax 30, he can call on a server 31. In this case A is left to a service supplying him with a batch of self-adhesive bar code labels. Each label contains in coded manner his identity and a value which increments between the individual labels in the form of a counter. The counter has a long period in order to avoid fraud.

The issuer A sticks a personalized graphic label 32 containing his identity to the document 33 and sends the thus formed page to the server. The server 31, which has a securizing module, identifies the requesting party and calculates the electronic signature of the message. Thus, the server has the keys or codes of all parties which have subscribed to the service. Then, the server 31 determines and places the graphic seal of the page in the bit map file. The server then returns the securized page 34 to the issuer A. The server can print the securized page and store it (35) for a possible notarization requested by A. Finally, the issuer A prints the certified document and then sends it to the recipient B via his standard fax machine 36. The received document 37 can then stored at (38).

Deteriorations due to the faxed exchange of documents

The exchange of a fax page involves deteriorations or noise effects. Different configurations can arise.

On the side of the issuer A, as described hereinbefore, it is a question of a composition on microcomputer, the latter either having a fax add-on card and can directly deliver the electronic file, corresponding to the message composed, on the telephone line, or he does not have this and must print the document on paper, which is scanned by his fax machine. If it is a document in paper form, it undergoes a scan by the issuing fax prior to despatch.

On the side of the recipient B, the effects due to the transmission noise are common to all configurations. Only noise is involved in the case of an on-line verification, because the bit map file is directly available. For an a posteriori verification performed by the recipient B, the latter must print the fax at the time of reception, store it and rescan in at the time of checking. For a verification carried out by a server, it is also necessary for the recipient B to fax the rescanned document.

The noise due to transmission is summarized in a few erroneous adjacent lines on the incoming bit map file. The scanning noise consist of translations, rotations, poor scannings, poorly contrasted letters, etc. Printing leads to local deformations of the image (the ink blots). Paper noises during storage are spots having variable size, shape and positions. Thus, the bit map file of a faxed page on the recipient side can be significantly deteriorated compared with the initial transmitted bit map file.

The invention makes it possible to use a representation of the fax page which does not vary as a result of the effects of scanning, transmission, storage and printing, but using a noise-resistant image graphic coding process. Use is made of a representation which can be easily reread after transmission and rescanning of the page. The graphic representation in question is of the bidimensional bar code type and has a good immunity with respect to all noise occurring in the case of a fax exchange.

The noise effects linked with the faxing are significant (spots, marks, folds, etc.). The graphic representation applied to the fax can consequently be used in a wider framework, when it is wished to authenticate an image without transmission.

Graphic signature zone

If it is wished to certify an already formed paper fax and the bottom of the free page is sufficiently high, the graphic seal is placed there. In the opposite case, the graphic seal is placed on a supplementary page (called security page), which gathers together the graphic seals of all the pages of a document.

Binary file

The information contained in the fax page is summarized in a binary file, which can be obtained in two ways. In the case of a composition on a microcomputer, the ASCII codes of the characters typed on the computer keyboard are collected and the codes are then converted into bits. In the case of an already formed paper fax, the bit map file of the zone to be certified (message M) resulting from the scanning is compressed in accordance with conventional fax codes, thus supplying a usable binary file.

Security

Before passing to the actual graphic coding, security takes place and it is possible to add to the bits corresponding to the fax page message M, the electronic signature of said message. There is no particular constraint concerning the electronic signature, because the issuer or user can easily supply the informations to the recipient with respect to the security elements.

The electronic signature of the message M uses informations contained in the message, secret elements stored in a smart card in the possession of the issuer, a random variable (e.g. the time and date in order to prevent any "reactivation", which is a fraud consisting of retransmitting, sometimes unknown to the true issuer, a document to the same addressee without the latter being aware of it) and the identity of the issuer. The smart card has a confidential code making it possible to authenticate its legitimate owner. The electronic signature S(M) of the message M obtained by a conventional cryptographic process can be verified by the card of the recipient if it is securized.

Graphic coding

The message M and its electronic signature S(M) form a binary series, which is then coded in bar code form. It is a question of an interlaced bar code in which the spaces and the bars represent an information. The bars or spaces always have two widths, namely wide and narrow. For each coded symbol the number of wide bars or spaces is constant. For example, "the two among five interlaced code" combines five elements (bars or spaces), whereof two are always wide. Therefore the width of the code is therefore fixed, e.g. five bars and five spaces. Each elementary code (bars and spaces) makes it possible to code a block of n bits, so that the code "two among five interlaced" can encode a number on six bits. The coding of the binary series consequently takes place by n bit segments: n/2 bits for the bars and n/2 bits for the spaces. The dimensions of the symbols can e.g. be ⅞ mm high, ⅜ mm wide for narrow elements and ⅝ mm wide for the wide elements.

The graphic zone is sequentially organized by blocks of n bits (elementary code bars+spaces) and by bar code lines. Finally, left and right marks, useful during the rereading of the bar codes, are placed at the start and finish of the code line. In order to become free of curvilinear deformations which occur in practice (a horizontal line is transformed into a curved line), the graphic zone is divided widthwise into several segments, e.g. four segments. Between each segment are placed intermediate marks fulfilling the same function as the left and right marks. One bar code line is thus composed of four graphic line segments.

In order to ensure high immunity to the noise of the graphic zone, at the end of each bar code line segment is added a check code (e.g. the sum of the numbers represented on the line segment) whereof the bits are also represented in bar code form. This code makes it possible to correct, during the reading of the line, graphic errors on the elementary bar codes. This graphic zone is incorporated into the bit map file of the page or document in such a way that it is possible to transmit the file obtained according to the fax protocol.

Decoding

The reverse procedure takes place for decoding. The working element is the bit map file of the image, the latter being received directly, or is obtained from the rescanned page in the case of an a posteriori check.

An "anti-noise" morphological filtering makes it possible to eliminate on that part of the bit map file corresponding to the graphic seal the image defects which have occurred during transmission and/or printing and/or storage (spots, lines, folds, etc.), whose size is strictly below the size of the narrow elements of the bar code.

Once this operation has taken place, there is a sequential reading of the seal line by line, segment by segment and from left to right. The marks added during the formation of the seal make it possible to guide the reading of the graphic zone. The decoding of the seal takes place in two stages. There is a graphic reading of each elementary bar code (e.g. five bars and five spaces) and then, by means of the truth table of the code, the corresponding bits are associated with the elementary code read. For example, the five bars of an elementary code induce three bits and the five spaces three other bits.

In the case of an a posteriori verification, the fax page is printed and then subsequently scanned. The effects due to the noise are then sensitive to the graphic seal. The lengths of the bars or spaces undergo algebraic deformations which, in the case of very noisy faxes, lead to the disappearance of certain narrow elements. This induces an erroneous reading for the elementary bar codes reached. The intrinsic redundancy of the code (presence of two wide elements among five in exemplified manner) makes it possible in certain cases to remove ambiguity and correctly decode the erroneous code. In the case of failure, an image processing procedure will determine the theoretical length of the bars or spaces as a function of the deformations of the dual elements.

For example, when the bars expand, this takes place to the detriment of the spaces, whose lengths can then be significantly affected. Through knowing the positions of the wide bars (dual elements), the procedure can calculate the theoretical lengths of the bars. It can thus determine the algebraic deformation undergone by each space on the basis of the deformations of the two surrounding bars. Thus, the theoretical length of the spaces is restored.

If the information on the dual elements is not adequate or if the determined code is impossible (e.g. three wide elements among five), the seal graphic reading procedure leaves the elementary bar codes indeterminate. This means that the block of n bits linked with this bar code can assume all values $C_i$ from 0 to $2^{n-1}$. This indetermination will be removed by means of the check code placed at the end of each bar code line segment. Thus, only the precise number $C_i$ will bring about correspondence between the series of numbers read on the complete graphic line segment with the check code of said line. In the case of the disappearance of one or more spaces or bars, the same type of procedure is activated.

Verification

The consistency between the bits of the message M and the bits of the electronic signature S(M) must then be verified. Thus, the electronic signature calculated by the smart card of the issuer is verifiable by the smart card of the recipient or by the server. In the case of success, the second stage consists of verifying the "graphic" consistency between the image decoded from the seal and the image received in uncoded form from the certified zone. If no consistency exists, the fax is considered to be non-integral.

In the case of a composition from a microcomputer, the algorithm determines on the basis of the bits read in the graphic zone the ASCII codes and gives back the corresponding characters. The recipient B does not necessarily have the character font used by the issuer and also the characters from the graphic seal appear in a type chosen by B. The recipient or the server (a posteriori verification) prints or displays on a screen the decoded characters and the operator visually compares them with the message contained in uncoded form on the received fax page. As the graphic coding is bijective, it is possible to detect any integrity defect on the fax by lack of consistency between the image and the seal.

In the case of a graphic seal representing the bit map file of the page, the binary file M obtained after reading must be decompacted (conventional fax decompacting) to supply the bit map file of the image delivered.

Thus, in a compacting operation after reducing the image to a resolution ¼ (1 pixel on 4 in height, 1 pixel on 4 in width), avoiding removing the isolated motifs, e.g. using the JBIG method, the file is compressed by a reversible coding used in faxing, namely e.g. the T4 or T6 coding.

The image received in uncoded form by the recipient is relatively noise-free in the case of a verification on reception (on line), but is necessarily noisy in the case of an a posteriori verification. This is due to the printing on paper of the image and the subsequent rescanning after storage. Thus, the image from the graphic zone is that received and there is no pixel-pixel correspondence due to deformations and deteriorations caused by noise.

Thus, an "elastic" difference is made between the image from the graphic seal and the bit map file received in uncoded form on paper. This procedure makes it possible to tolerate local deformations between two images. Only a fraud on the fax text induces a high difference.

Such a difference is based on a dynamic programming algorithm, which seeks to minimize the distance between the two images, as described in the article by S. Duval, R. Collot and M. Achemial entitled "Comparison of two images by dynamic programming" (published in IEEE International Conference on Image Processing 5–8 Sep. 1989). Thus, this procedure makes it possible to compare two images with a generally similar form, the only accepted differences being local deformations and translations. Thus, with a pixel (i,j) of the first image, the algorithm associates the pixel of the second image belonging to the vicinity of the pixel (i,j) such that the distance between the two pixels is at a minimum.

For reasons of simplicity, the comparison between the two images can take place visually by the recipient or server, who prints or displays on the screen the result of the image contained in the graphic zone. The performance characteristics of the eye-brain system make it possible for the operator to reject deformations or defects of a minor nature which can be imputed to noise. However, the falsification by a third party (integrity defect) or by the fraudulent recipient or addressee (subsequent check) can easily be detected.

The server referred to hereinbefore can fulfil an electronic "notary" function consisting of a data processing terminal having a fax link. Such a server is necessary if the recipient is not securized in order to permit an a posteriori verification. It then fulfils filing and time stamping functions. It can provide an "acknowledgement of receipt" on the addressee side.

Thus, the invention makes it possible to verify the integrity of an image or a document and avoid the repudiation of a document received by fax.

The security services developed here for the fax are transposable in general terms to an image authentification graphic coding.

Integrity

With regards to integrity, a fax can undergo malevolent modifications during its transmission or storage on the recipient side. For checking the integrity, there is a digital support of the page bit map file (directly for an on line verification or obtained after rescanning for an a posterjori verification). The seal is read, the electronic signature S(M) is verified and then consideration is given to the consistency between the image from the graphic seal and the image received. Any integrity deficiency on the part of the received document is detected due to the non-conformity of the signature S(M) and the message M and/or the non-conformity of the uncoded message M and the seal. For example, the fraudulent recipient B cannot modify the message M and its seal in a coherent manner. Thus, if he modifies M to M1, he can gain access to the binary series of M1, but he cannot obtain the signature S(M1) produced with the secret key of the issuer. In this case, the result of the verification of the electronic signature is unsatisfactory. This prevents B from acquiring access to the graphic seal corresponding to M1. The symmetrically reverse operation consisting of finding the message M' from a signature S(M') fails for the same reason. Thus, the verification algorithem detects any integrity deficiency of the document. The analogy with a physical seal placed on a letter is clear.

Non-repudiation

With regards to non-repudiation, this is the case of a delayed check and a storage on paper. The first stage consists of verifying the electronic signature S(M) contained in the graphic representation. The identity of the issuer is then proved. The analogy with a seal placed on a paper document giving the issuer's identity is clear. He then checks the conformity of the binary message M and the signature and the correspondence between the graphic coding and the image received. In the case of a positive result, the issuer cannot repudiate the document submitted by the recipient to a legal authority. In the case of a dishonest addressee, who falsifies in his own interests the fax received, the issuer can request a judge to check the integrity of the document submitted by the addressee. The verification then indicates a lack of consistency between the graphic seal and the message. Thus, the addressee cannot imitate the seal of the issuer.

The interest of the present invention is that it permits the authentification of an image or a document by adding a graphic seal. The use of image processing methods makes it possible to associate with any page of a document a graphic seal formed from interlaced bar codes. This graphic seal guarantees the integrity of the document and gives the origin thereof.

The graphic coding process has been described in the context of an exchange of documents by fax in a direct manner between two fax machines or using a server. However, the invention is more general and can also apply to other cases. The graphic code e.g. makes it possible to carry out a securized paper storage of documents. Another application is the certified copy of documents.

We claim:

1. Device for securing a document in a noisy environment, comprising a processing module, which calculates and associates with each page of said document a graphic seal, said graphic seal representing said each page, said graphic seal being formed from interlaced bar codes comprised of spaces and bars forming narrow and wide elements so as to represent an information, and said graphic seal being organized sequentially in blocks of n bits and in bar code line segments, said code line segments having a start and a finish, said code line segments having a left mark placed at the start of the code line segments and a right mark being placed at the finish of the code lines, intermediate marks being placed between code line segments and a check code being placed at the end of each bar code line segment.

2. Device according to claim 1, wherein each page of said document is converted into a binary file for fax transmission, and a security module places said graphic seal in the binary file.

3. Device according to claim 1, wherein said processing module is a microcomputer, and said microcomputer calculates and positions the graphic seal at the time of composing the document.

4. Device according to claim 1, wherein said processing module is a fax machine having an integrated security module.

5. Device according to claim 1, wherein said processing module comprises a fax machine and a security module connected in series.

6. Device according to claims 4 or 5, wherein the security module has a smart card reader, said reader having the ability to read a user unique smart card.

7. Device according to claim 1, wherein the graphic seal can be decoded and verified by a recipient module.

8. Process for securing a document in a noisy environment, comprising the step of associating a graphic seal with each page of said document, said graphic seal representing each of said pages, and formed from interlaced bar codes comprising spaces and bars forming narrow and wide elements so as to represent an information, said graphic seal being organized sequentially in blocks of n bits and in bar code line segments, said code line segments having a start and a finish, said code line segments having a left mark placed at the start of the code line segments and a right mark being placed at the finish of the code lines, intermediate marks being placed between code line segments and a check code being placed at the end of each bar code line segment.

9. Process according to claim 8, wherein said graphic seal is created at the time the document is created.

10. Process according to claim 8, further comprising the steps of decoding said graphic seal, and filtering said graphic seal with an anti-noise morphological filter that eliminates image defects which have occurred during the transmission, printing and/or storage of said document, said image defects are smaller than the size of the narrow elements.

11. Process according to claim 10, further comprising the step of sequentially reading the graphic seal segment by segment, said reading being guided by said left, right and intermediate marks.

12. Process according to claim 8, further comprising the step of decoding said graphic seal by reading each bar code segment and generating an image corresponding to said graphic seal.

13. Process according to claim 8, further comprising the steps of decoding said graphic seal and, in the case of an erroneous decoding, using redundancies inherent in said graphic seal to decode said graphic seal.

14. Process according to claim 13, further comprising the step of using an image processing procedure to determine the theoretical lengths of the bars and spaces as a function of deformations of the narrow and wide elements.

15. Process according to claim 8, further comprising the steps of decoding said graphic seal and removing indeterminacies, said indeterminacies being caused by inadequate information on the narrow and wide elements, impossible results, or disappearance of one or more spaces or bars, by using the check code placed at the end of each bar code line segment.

16. Process according to claim 8, further comprising the step of faxing said document with said graphic seals associated with each of said pages.

17. Process according to claim 16, wherein said graphic seal is placed at the bottom of each page.

18. Process according to claim 8, further comprising the steps of converting said document and said graphic seal into a series of electronic bits and verifying the consistency between the bits of the document and the bits of said graphic seal.

19. Process according to claim 8, further comprising the steps of decoding said graphic seal and verifying the consistency between the decoded graphic seal associated with each page and the page in uncoded form.

20. Process according to claim 8, further comprising the steps of decoding said graphic seals and verifying the consistency between said graphic seals and said pages of said document, said verification process being an elastic comparison.

21. Process for creating an authentication graphic code for a document having symbols, comprising the step of forming an interlaced bar code having spaces and bars of two widths, namely wide and narrow, and said bar code representing said symbols, and for each coded symbol the number of wide bars and spaces is constant.

22. Process according to claim 21, wherein the graphic code is organized in blocks of n bits and in bar code line segments, said segments having a start and a finish.

23. Process according to claim 22, further comprising the steps of placing left and right marks respectively at the start and the finish of the code line, placing intermediate marks between each segment and placing a check code at the end of each bar code line segment.

24. Process according to claim 8, wherein said document is scanned and said graphic seal is created at the time said document is scanned.

25. Process according to claim 16, wherein said graphic seals for all pages of said document are placed on a supplementary page.

* * * * *